United States Patent [19]

Kamide et al.

[11] Patent Number: 5,219,675
[45] Date of Patent: Jun. 15, 1993

[54] ELECTROLYTE FOR FUEL CELL

[75] Inventors: Makoto Kamide; Yasuo Suzuki; Hiroshi Yamagata, all of Iwata, Japan

[73] Assignee: Yamaha Hatsudoki Kabushiki Kaisha, Iwata, Japan

[21] Appl. No.: 546,545

[22] Filed: Jun. 29, 1990

[30] Foreign Application Priority Data

| Jun. 30, 1989 | [JP] | Japan | 1-166767 |
| Jun. 30, 1989 | [JP] | Japan | 1-166768 |
| Jun. 30, 1989 | [JP] | Japan | 1-166769 |
| Jun. 30, 1989 | [JP] | Japan | 1-166770 |
| Jun. 30, 1989 | [JP] | Japan | 1-166771 |

[51] Int. Cl.$^5$ .................................. H01M 8/08
[52] U.S. Cl. ........................ 429/46; 429/188; 429/194; 429/195; 429/203; 429/204; 429/198; 429/199; 204/129.9; 204/129.95; 252/62.2
[58] Field of Search .............. 429/46, 188, 203, 194, 429/195, 204, 198, 199; 252/62.2; 204/129.75, 129.95, 129.9

[56] References Cited

U.S. PATENT DOCUMENTS

| 1,748,485 | 2/1930 | Kugel | 429/203 |
| 2,481,204 | 9/1949 | De Long et al. | 429/203 |
| 2,992,143 | 7/1961 | Clifford et al. | 429/203 |
| 3,220,887 | 11/1965 | Delahunt et al. | 429/203 |
| 4,001,039 | 1/1977 | Elmore et al. | 429/46 |
| 4,529,671 | 7/1985 | Kahara et al. | 429/46 |
| 4,548,875 | 10/1985 | Lance et al. | 429/46 |
| 4,639,401 | 1/1987 | Jackovitz et al. | 429/46 |

FOREIGN PATENT DOCUMENTS 86720 8/1983 European Pat. Off. ............ 429/203

Primary Examiner—R. Bruce Breneman
Attorney, Agent, or Firm—Ernest A. Beutler

[57] ABSTRACT

Improved electrolyte compositions for a phosphoric acid type fuel cell are disclosed, which inhibit the growth of phosphoric acid crystals and which lower the freezing points of the electrolytes so as to prevent the electrolyte from freezing when operation of the fuel cell is stopped at low temperatures.

19 Claims, 8 Drawing Sheets

Concentration of phosphoric acid
(calculated in terms of orthophosphoric acid)

Concentration of phosphoric acid
(calculated in terms of orthophosphoric acid)

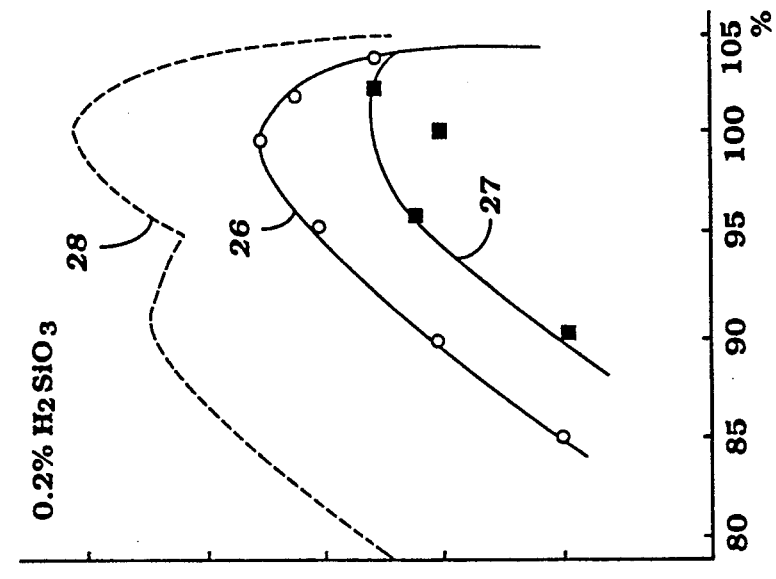
Figure 3A
Figure 3B
Figure 3C
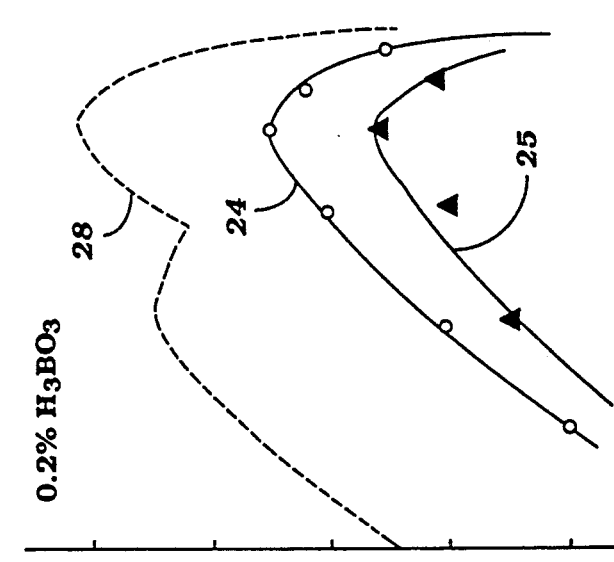
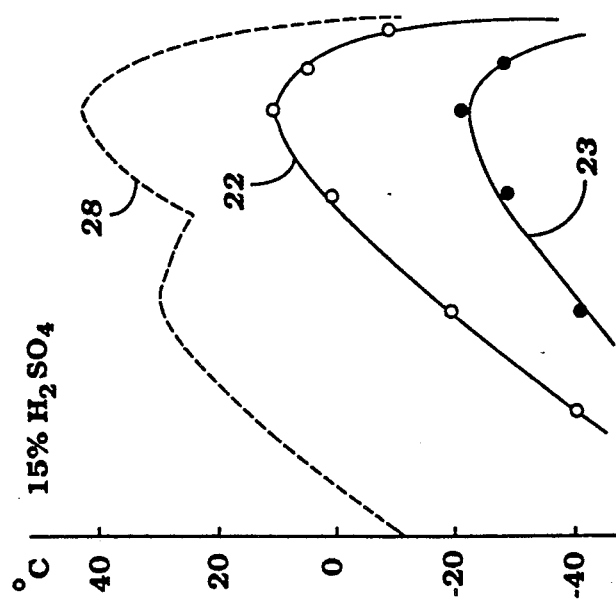

Concentration of phosphoric acid
(calculated in terms of orthophosphoric acid)

Concentration of phosphoric acid
(calculated in terms of orthophosphoric acid)

Concentration of phosphoric acid
(calculated in terms of orthophosphoric acid)

ELECTROLYTE FOR FUEL CELL

BACKGROUND OF THE INVENTION

This invention relates to electrolytes for a fuel cell, and more particularly to improved phosphoric acid electrolyte compositions for a phosphoric acid type fuel cell, which inhibit the growth of phosphoric acid crystals, and which have lower freezing points than electrolytes comprised only of phosphoric acid so as to prevent the electrolyte from freezing even when operation of the cell is stopped at low temperatures.

It is well known that a fuel cell produces electrical energy from a reaction of an enriched or reformed fuel and oxygen. Hydrogen is typically used as the fuel and may be obtained by reforming a methanol-water mixture in a reformer that is comprised of a catalyst and a heater for vaporizing the unreformed fuel. Air is normally the source of oxygen for the fuel cell. Oftentimes, a plurality of cell units are stacked in series so as to increase the output voltage generating capacity of the fuel cell.

One type of cell unit is comprised of an anode, a cathode, and an electrolyte matrix impregnated with an electrolyte, such as phosphoric acid, interposed between the anode and cathode. Separators are used for separating the anode of one cell unit from the cathode of an adjacent cell unit and for electrically connecting the cell units in series. The separators typically include a plurality of fuel passages on the anode side and a plurality of air passages on the cathode side of the separator. These passages act to separate the inward flow of fuel and air from each other. Once inside the fuel cell, the fuel and air react to produce electrical energy through an exothermic electrochemical reaction. In operation of the fuel cell, a reformed hydrogen-rich gaseous fuel is fed through the fuel passages into the cell where it is oxidized, releasing electrons to the anode. Air is delivered through the air passages and is reduced in the cell so as to consume electrons. As a result, the fuel cell stack generates a voltage.

As previously noted, one type of fuel cell uses phosphoric acid as the electrolyte. Aqueous phosphoric acid is generally known to be an excellent electrolyte in that it is stable but has a low vapor pressure at temperatures around 200° celsius and is also a good conductor. Phosphoric acid also rejects carbon dioxide, and at temperatures around 200° celsius the anode is able to withstand carbon containing impurities such as carbon monoxide in the fuel gas.

Under certain conditions, however, such as in low temperatures, strong phosphoric acid may freeze when the operation of the fuel cell is stopped. It is believed that this freezing is due to the large intermolecular force of $H_3PO_4$ and the molecular structure of $H_3PO_4$ wherein the $PO_4$ radicals of the acid facilitate the stable formation of crystal lattices by forming tetrahedral structures which are interlinked by hydrogen bonds.

It is, therefore, a principal object of this invention to provide improved electrolyte compositions for a phosphoric type fuel cell that prevent the formation of phosphoric acid crystals and which do not freeze even when the operation of the cell is stopped at low temperatures.

It is a further object of this invention to provide improved electrolyte compositions for a phosphoric acid type fuel cell that do not cause any deterioration in the cell's efficiency or quality.

SUMMARY OF THE INVENTION

Several embodiments of an electrolyte for a phosphoric acid type fuel cell are provided which have lower freezing points than electrolytes comprised only of phosphoric acid. In a first embodiment, the electrolyte is comprised of phosphoric acid and a conjugate salt or phosphate. Preferably, the anion of the conjugate salt or phosphate is the same as the anion of orthophosphoric acid, pyrophosphoric acid, triphosphoric acid or normal condensation phosphoric acid so as to inhibit the growth of phosphoric acid crystals and to lower the freezing point of the electrolyte.

In a second embodiment of the invention, the electrolyte is comprised of phosphoric acid and a non-conjugate inorganic salt which inhibits the formation of phosphoric acid crystals and which lowers the freezing point of the electrolyte.

In a third embodiment of the invention, the electrolyte is comprised of phosphoric acid and a hetero acid having proton conductivity so as to produce an electrolyte having a lower freezing point than one made only of phosphoric acid.

In a fourth embodiment of the invention, the electrolyte is comprised of phosphoric acid and a non-ionic substance such as $C_nF_{2n+2-m}(OH)_m$ which prevents phosphoric acid crystals from growing excessively large, and as a result, inhibits their freezing.

In a fifth embodiment of the invention, the electrolyte is comprised of phosphoric acid and a mixture of compounds selected from the group consisting of phosphates, non-conjugate inorganic salts, hetero acids having proton conductivity and non-ionic substances, which synergistically act to further lower the freezing point of the electrolyte without deteriorating the electrolyte or the cell's quality. The mixture can comprise two or more compounds from the same or different categories.

BRIEF DESCRIPTION OF THE DRAWINGS

FIGS. 3A, 3B and 3C show the freezing points in degrees Celsius of various phosphoric acid electrolyte solutions containing different hetero acids having proton conductivity or no additives plotted against the concentration of phosphoric acid calculated in terms of orthophosphoric acid in the electrolyte solution.

DETAILED DESCRIPTION OF THE PREFERRED EMBODIMENTS

In each of the embodiments, the improved electrolyte composition or solution for a phosphoric acid type fuel cell is comprised primarily of phosphoric acid. This phosphoric acid preferably has an 80 to 105% concentration of orthophosphoric acid $2H_3PO_4$ ($P_2O_5.3H_2O$) or equivalent so as to ensure the quality and efficiency of the fuel cell. In addition to orthophosphoric acid, the phosphoric acid can also comprise pyrophosphoric acid, triphosphoric acid or normal condensation phosphoric acid of up to the 8th or 9th grade in condensation level, and one of these acids can also be used instead of orthophosphoric acid in the same concentration range as that stated above. When the concentration of the phosphoric acid is less than 80% of one of these acids, the freezing point is usually low enough that the electrolyte will not freeze even when the operation of the cell is stopped in cold environments; however, such lower concentrations also reduces the quality of the cell.

In the first embodiment of the invention, a conjugate salt or phosphate is added to the phosphoric acid electrolyte so as to lower the freezing point of the electrolyte. Phosphates and highly concentrated or strong phosphoric acid of the concentrations typically used in fuel cells differ in their constituent cations, their molecular sizes and electric charge balances. Their molecular structures, however, are much alike. As a result, the common phosphoric ions of the phosphate enter into the crystal lattices of the phosphoric acid. The cations of the phosphate also enter into the crystal lattices so as to maintain the electric charge balance. This inhibits the growth of the crystal lattices of the phosphoric acid and thereby lowers the freezing point of the electrolyte.

The constituent cations of the phosphate are preferably alkali metal elements or alkaline earth metal elements, such as Na, K, or Mg. Al cations can also be used since these ions are also soluble in a phosphoric acid solution.

The constituent anions of the phosphate are preferably the same as those in orthophosphoric acid, but may also be the same as those in pyrophosphoric acid, triphosphoric acid or normal condensation phosphoric acid of up to the 8th or 9th grade in condensation level.

The preferred phosphates for use with this embodiment are $KH_2PO_4$, $K_2HPO_4$, $K_3PO_4$, $NaH_2PO_4$, $Na_2HPO_4$, $Na_3PO_4$, $Na_2H_2P_2O_7$, $Na_4P_2O_7$, $K_2H_2P_2O_7$, and $K_4P_2O_7$. Among these, $KH_2PO_4$ and $NaH_2PO_4$ are especially preferred.

Figure 1:
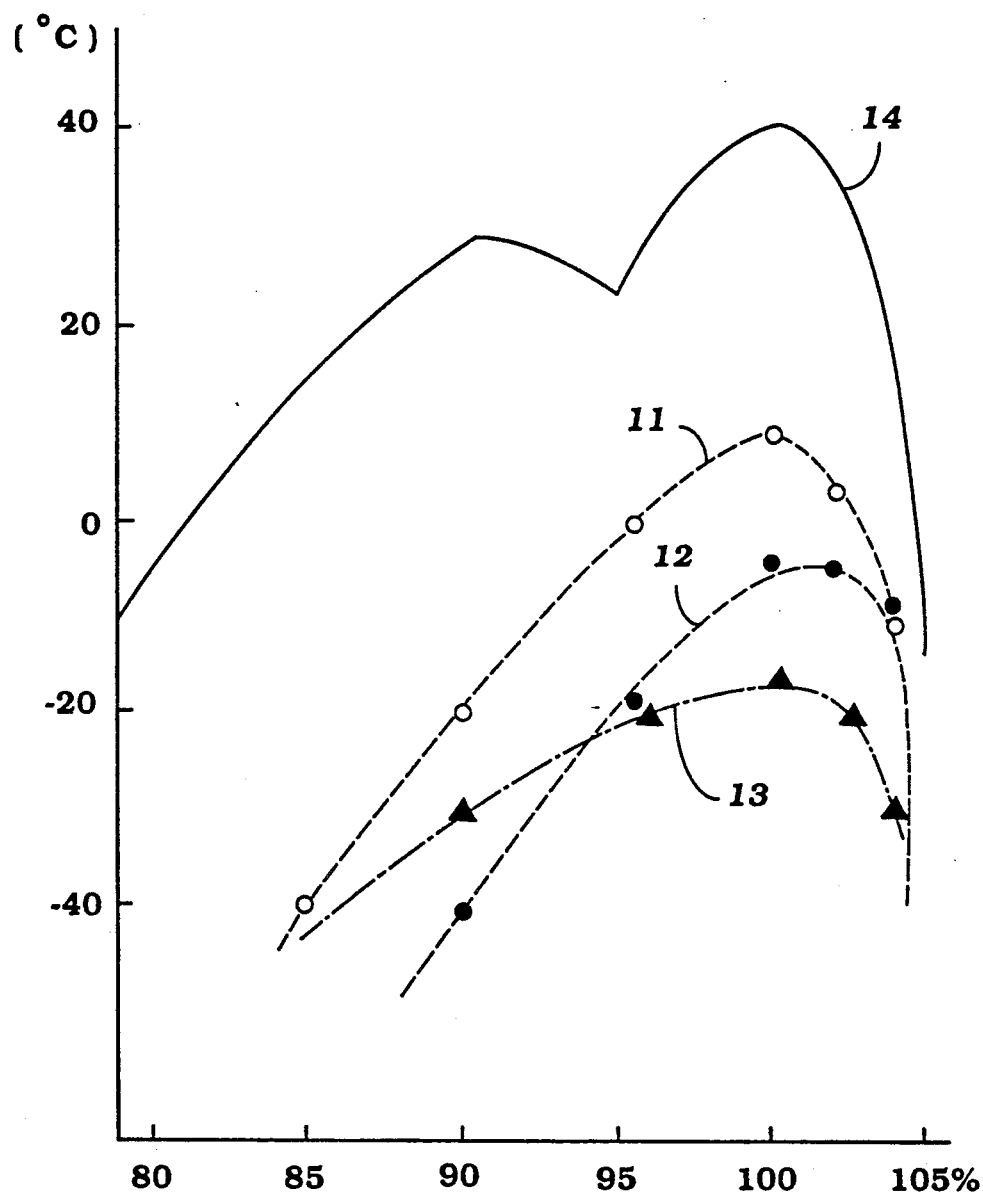
FIG. 1 shows the freezing points in degrees Celsius (°C.) of various phosphoric acid electrolyte solutions containing different phosphate additives or no additives plotted against the concentration of phosphoric acid calculated in terms of orthophosphoric acid in the electrolyte solution.

Experiments were conducted in which these latter two phosphates were added to various phosphoric acid solutions having different concentrations of orthophosphoric acid so as to examine the change in the freezing point (crystallization temperature) of the electrolyte solutions. FIG. 1 graphically illustrates the results of these experiments. In FIG. 1, the freezing points of particular electrolytes are plotted against orthophosphoric acid concentration. The data points indicated by the hollow circles and connected by the curve designated by the numeral 11 indicate the freezing points for the various phosphoric acid electrolyte solutions to which no phosphates were added. In contrast to the case where no phosphates were added, when $NaH_2PO_4.2H_2O$ and $KH_2PO_4$ were respectively added to various phosphoric acid solutions, the freezing points of the phosphoric acid electrolytes were lowered by 10 to 20 degrees Celsius. The data points shown by the solid circles and curve indicated by numeral 12 indicate the freezing points for the electrolytes to which $NaH_2PO_4.2H_2O$ was added so as to constitute 2.4% by weight of the total electrolyte solution. The freezing points for the electrolytes to which $KH_2PO_4$ was added are shown by the solid triangles in FIG. 1 along the curve indicated by numeral 13. $KH_2PO_4$ constitutes 5% by weight of the total electrolyte solution. The solid line 14 shown in FIG. 1 illustrates the freezing points obtained from the literature of various phosphoric acid solutions.

In the second embodiment of the invention, non-conjugate inorganic salts are added to the phosphoric acid electrolyte solution to lower the electrolyte freezing point. Although non-conjugate inorganic salts have no constituent ions in common with strong phosphoric acid, their ions neutralize the electric charge of the mixture so as to form stable ionic mixtures in the strong phosphoric acid. The addition of non-conjugate inorganic salts are, therefore, believed to inhibit crystallization of the strong phosphoric acid and to prevent the freezing of the phosphoric acid electrolyte solution.

The non-conjugate inorganic salts which are used in this embodiment must be ones that can dissolve in the phosphoric acid. These salts preferably do not react with the phosphoric acid; however, salts of the above type which do react may be used, provided that the reaction does not cause any adverse effects on the fuel cell or on the electrolyte.

The non-conjugate inorganic salts should preferably have as their cations alkali metals or alkaline earth metals such as Na, K, Mg or Ca, although metals such as Mn, Fe, Co, Ni or Al may also be used as cations. The constituent anions of the non-conjugate inorganic salts should preferably be sulfuric acid anions, carbonic acid anions, silicic acid anions, boracic acid anions or equivalent. Chlorides are undesirable for use with this invention because highly corrosive hydrogen chloride gas is usually generated in the presence of phosphoric acid. Although carbonates emit carbon acid gas, they can be used as the non-conjugate inorganic salt, if the gas is eliminated together with the vapor. In addition, although metallic salts, which generally do not dissolve easily into a phosphoric acid solution, are considered to be unfavorable for the invention, a metallic salt such as sulfate that can dissolve easily in the phosphoric acid solution may be used in this invention.

Examples of non-conjugate inorganic salts for use with this embodiment of the invention are $ZnSO_4$, $NiSO_4$, $Na_2SO_4$, $BeSO_4$, $CdSO_4$, $CoSO_4$, $FeSO_4$, $Al_2(SO_4)_3$, $K_2Mg(SO_4)_2$, $K_2SO_4$, $K_2Zn(SO_4)_2$, $MgSO_4$, $MnSO_4$, $K_2CO_3$, $Na_2CO_3$, $MgCO_3$, $CaCO_3$, $K_2SiO_3$ and $Na_2B_4O_7$.

Figure 2C:
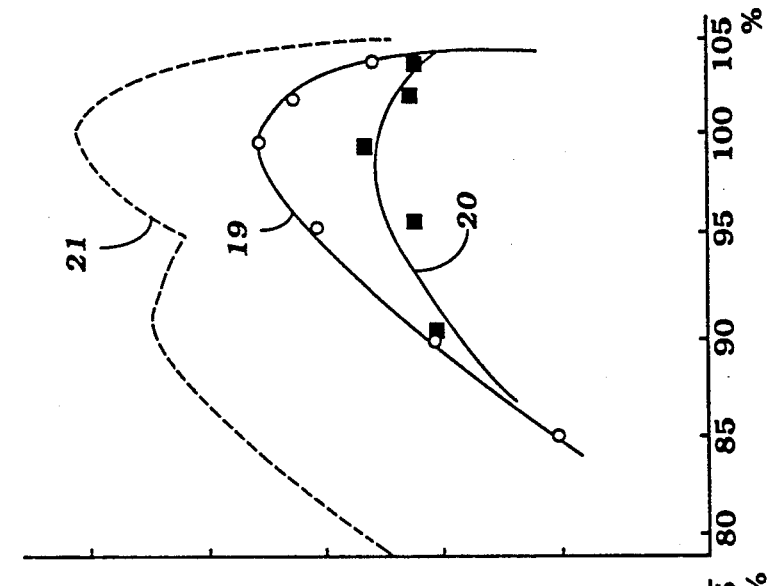
FIGS. 2A, 2B and 2C show the freezing points in degrees Celsius of various phosphoric acid electrolyte solutions containing different non-conjugate inorganic salts or no additives plotted against the concentration of phosphoric acid calculated in terms of orthophosphoric acid in the electrolyte solution.
Figure 2B:
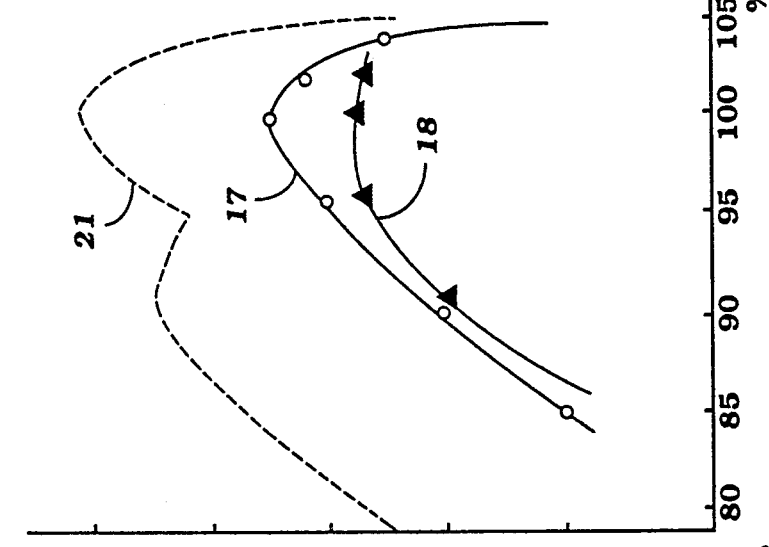
Figure 2A:
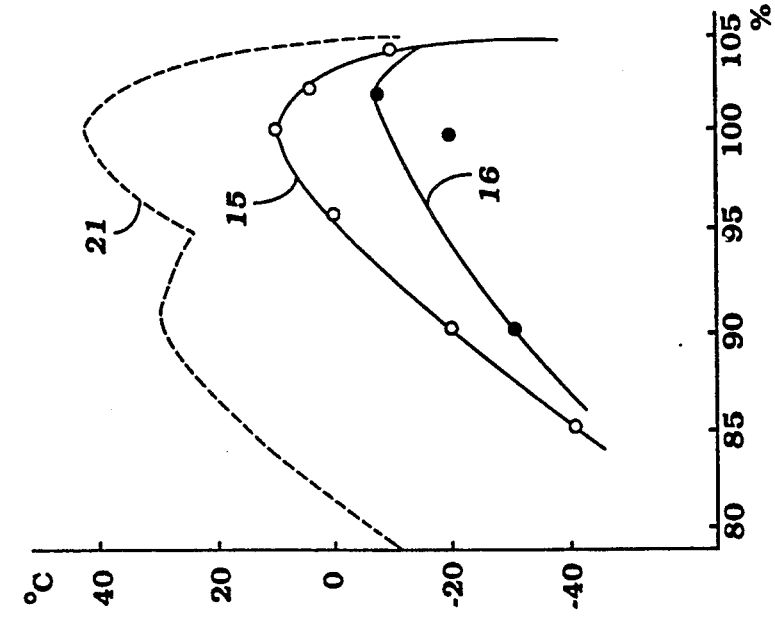
Figure 4:
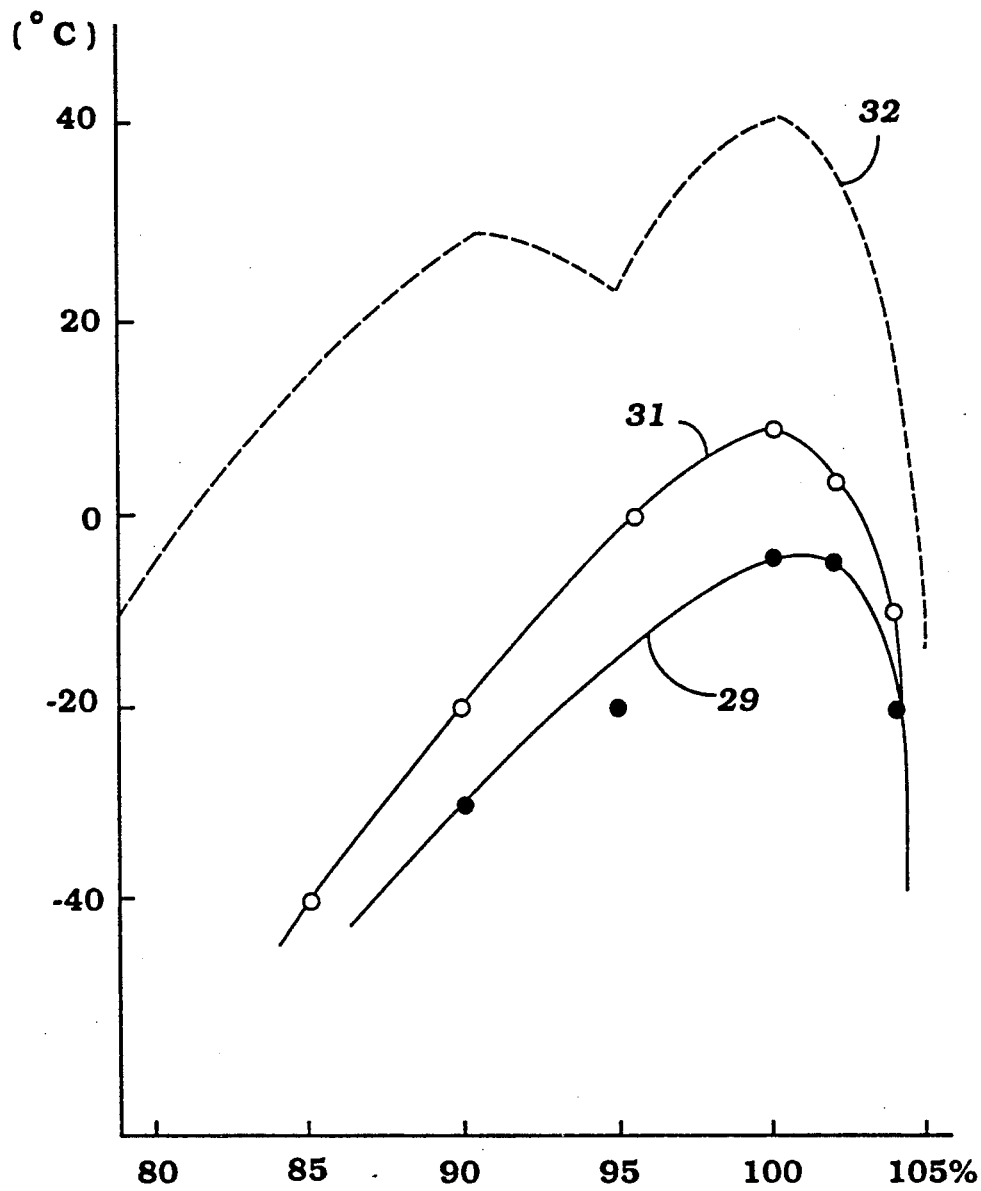
FIG. 4 shows the freezing points in degrees Celsius of various phosphoric acid electrolyte solutions containing different non-ionic substances or no additives plotted against the concentration of phosphoric acid calculated in terms of orthophosphoric acid in the electrolyte solution.

Non-conjugate inorganic salts were added to phosphoric acid solutions having different concentrations of orthophosphoric acid to examine the change in the freezing points (crystallization temperature) of the electrolytes. FIG. 2A illustrates the difference in freezing points between various phosphoric acid solutions to which nothing was added shown by the hollow circles and curve 15, and various phosphoric acid solutions to which $K_2SO_4$ was added to constitute 2% by weight of the total electrolyte solution, shown by the solid circles and approximated by curve 16. FIG. 2B shows the difference in freezing points between various phosphoric acid solutions containing no additives, shown by the hollow circles and curve 17, and various phosphoric acid solutions to which $MgSO_4$ was added to constitute 1% by weight of the total electrolyte solution, shown by the solid triangle data points and curve designated by the numeral 18. In FIG. 2C, the data points shown by hollow circles and curve 19 represent the freezing points of various phosphoric acid solutions to which nothing was added. The data points shown by the solid squares and approximated by curve 20 represent the freezing points for the various phosphoric acid solutions to which $K_2SiO_3$ was added to constitute 0.2% by weight of the total electrolyte solution. As these graphs indicate, the freezing points of the phosphoric acid electrolytes was lowered by 10° to 20° Celsius when a non-conjugate inorganic salt was added to the phosphoric acid solution. The dashed lines of FIGS. 2A, 2B and 2C show the freezing points obtained from the literature of various phosphoric acid solutions. These dash lines are designated by the numeral 21.

In a third embodiment of the invention, a hetero acid or acids having proton conductivity is added to the phosphoric acid solution electrolyte so as to lower the freezing point of the electrolyte. In this embodiment the addition of a hetero acid is believed to lower the free energy of the phosphoric acid electrolyte solution.

Any hetero acid used must dissolve completely in the phosphoric acid solution to form a homogenous phase and must not degenerate the properties of the electrolyte. The inventors have determined that a hetero acid which has proton conductivity (i.e., functions as an $H^+$ donor) and does not react with phosphoric acid will usually satisfy the above conditions and therefore can be used as an additive in this embodiment. It has further been determined by the inventors that the hetero acid or acids used in this invention should have the same proton conductivity as the phosphoric acid to which it is added. Phosphoric acid itself should not be used as the hetero acid in this embodiment. Examples of such acids for use with this embodiment are sulfuric acid ($H_2SO_4$), boracic acid ($H_3BO_3$) or silicic acid ($H_2SiO_3$). Although it is preferable to use an inorganic acid that does not react with the phosphoric acid solution, an organic acid can also be used, provided that it dissolves uniformly into the phosphoric acid electrolyte and does not react with the phosphoric acid.

Hetero acids were added to various solutions of phosphoric acid of different concentrations of orthophosphoric acid to determine the change in the freezing points (crystallization temperature) of the electrolytes. FIG. 3A shows the freezing points of various phosphoric acid solutions containing no additives, indicated by the hollow circle data points and curve 22. Also shown in FIG. 3A are the freezing points of various phosphoric acid solutions to which $H_2SO_4$ was added to constitute 15% by weight of the total electrolyte solution. These freezing points are represented by the solid circles and the curve designated by numeral 23. In FIG. 3B, the hollow circle data points connected by the curve 24 are the freezing points for the different phosphoric acid solutions having no additives, while the data points indicated by the solid triangles and curve 25 represent the freezing points of the different phosphoric acid solutions to which $H_3BO_2$ was added to constitute 0.2% by weight of the total electrolyte solution. FIG. 3C shows a comparison between the freezing points of various phosphoric acid solutions having no additives (data points shown as hollow circles and indicated by curve 26), and the freezing points of various phosphoric acid solutions to which $H_2SiO_3$ was added to constitute 0.2% by weight of the total electrolyte solution (indicated by the solid circles and approximated by the curve indicated by numeral 27). As these figures indicate, the freezing points of the phosphoric acid electrolyte solutions were lowered by 10 to 20 degrees Celsius in the cases where a hetero acid having proton conductivity was added to the phosphoric acid as compared to the phosphoric acid solutions to which no additives were added. The dashed lines indicated by numeral 28 show the freezing points obtained from the literature of phosphoric acid solutions.

When using boracic acid or silicic acid, only 0.2% by weight of these acids was necessary to cause marked drops of the freezing points. This may be due to the fact that boracic acid has a planar triangular structure and silicic acid has a tetrahedral structure which tend to form high polymer structures using bridge bondings to increase their viscosities. This will inhibit the formation of crystalline nuclei in the phosphoric acid so as to inhibit the growth of phosphoric acid crystals. At low temperatures in which the electrolyte would normally freeze, this phosphoric acid/hetero acid mixture is supercooled to a stable transient state wherein no crystallization occurs. For this reason, only a small amount (i.e., 0.2% by weight boracic or silicic acid) is needed to prevent the freezing of the electrolyte at low temperatures.

A fourth embodiment of the invention involves the addition of one or more non-ionic substances to the phosphoric acid solution electrolyte. Suspending non-ionic substances in the phosphoric acid solution increases the intermolecular distance between the phosphoric acid molecules, and as a result, usually inhibits crystallization. This lowers the freezing point of the electrolyte. However, even if the phosphoric acid does begin to crystallize, the presence of the non-ionic substance or substances inhibits the growth of phosphoric acid crystals and will cause the freezing point of the electrolyte to drop.

Any non-ionic substance used with this embodiment of the invention must be dissolved or suspended uniformly in the phosphoric acid, but must not chemically react with the phosphoric acid. In addition, any non-ionic substance used should not vaporize at the operating temperatures of approximately 200 to 220 degrees celsius. Compounds with functional groups such as hydroxyl radicals (—OH) are preferable so as to ensure to that the non-ionic substance is soluble in phosphoric acid. Moreover, to prevent the breakage of the C-C bonds of the non-ionic substance, it is desirable that the non-ionic substance also have an electronegative element such as a halogen atom. A fluoride alcohol is an example of such a non-ionic substance. It is usually desirable that the compound have four or more carbon atoms so that the boiling point of the electrolyte will be higher than 200 degrees Celsius. However, if the non-ionic substance contains more than six carbon atoms, its solubility in the phosphoric acid will decrease. Thus, a compound having between four and six carbon atoms is most desirable. If a compound having more than six carbon atoms is used, the compound can be made more soluble by introducing additional hydroxyl radicals. The compound may have a straight chain, branch, or cyclic structure, provided that the above conditions are met. Aromatic alcohols or alcohols which have a polycyclic structure may also be used as a non-ionic substance in this embodiment, if the above conditions are satisfied. Examples of non-ionic substances which can be used with this embodiment includes perfluoroalcohol which can be obtained by substituting all of the hydrogen atoms of an alkyl alcohol with fluorine atoms. These compounds are desirable because they generally have good thermal resistance and are stable. Compounds having the general formula $C_nF_{2n+2-m}(OH)_m$, of which $C_nF_{2n+1}OH$ is a more specific embodiment, where n and m are positive integers and n=4 to 6 are preferred. A substituted phenol having the formula $C_6F_5OH$ can also be used.

Experiments were conducted in which a non-ionic substance or substances was added to various phosphoric acids solutions containing different concentrations of orthophosphoric acid to examine the change in the freezing points (crystallization temperature) of the electrolytes. When perfluoro-butylalcohol was added to the phosphoric acid electrolyte solutions so as to constitute 1% by weight of each of the total electrolyte solutions, the freezing points dropped by 10 to 15 degrees Celsius, in contrast to phosphoric acid solutions to which nothing was added. The data shown by the solid circles and approximated by curve 29 represent the freezing points of the various phosphoric acid electrolyte solutions to which perfluorobutylalcohol was added. The hollow circles connected by curve 31 are the freezing points of the phosphoric acid solutions containing no additives. Curve 32 represents the freezing points of phosphoric acid solutions obtained from the literature.

Although the above mentioned additives are effective in lowering the freezing point of a phosphoric acid electrolyte solution, there are limits as to how much of these compounds can be added. For example, if too much phosphate or non-conjugate inorganic salt is added to the electrolyte solution, these compounds will separate out and form crystals, causing the freezing point of the electrolyte to increase. Thus, these compounds should not be added to the point where they are no longer soluble in the phosphoric acid solutions, or where they will separate out. The amount of phosphate usually should constitute less than 30% by weight of the total solution, while the amount of non-conjugate inorganic salt added should constitute less than 20% by weight of the total electrolyte solution.

In the case of a hetero acid or acids, if too much is added, it may deteriorate the quality of the phosphoric acid electrolyte, and if the hetero acid is also one that oxidizes, carbon electrodes can also be deteriorated. To avoid these unfavorable consequences, the hetero acid used should constitute less than 50% by weight of the total phosphoric acid electrolyte solution.

Excessive addition of a non-ionic substance can also degrade the conductive qualities of the phosphoric acid solution. Although the amount to be added will vary between different non-ionic substances, the non-ionic substance should usually constitute less than 40% by weight of the total electrolyte solution.

A fifth embodiment of this invention involves the addition of two or more additives to lower the freezing point of the electrolyte solution even further but without lowering the quality of either the electrolyte or the other cell components. Although the mixture ratio and the amount of each additive will depend largely on the particular additives used, it is desirable that the concentration of a particular additive be less than it otherwise would be if added alone. The amount of the added mixture should constitute less than 60% by weight of the total phosphoric acid electrolyte solution. The additives used can be from any of the aforementioned categories (i.e., conjugate salts or phosphates, non-conjugate inorganic salts, hetero acids or non-ionic substances), and more than one additive can be taken from any particular category.

Figure 5:
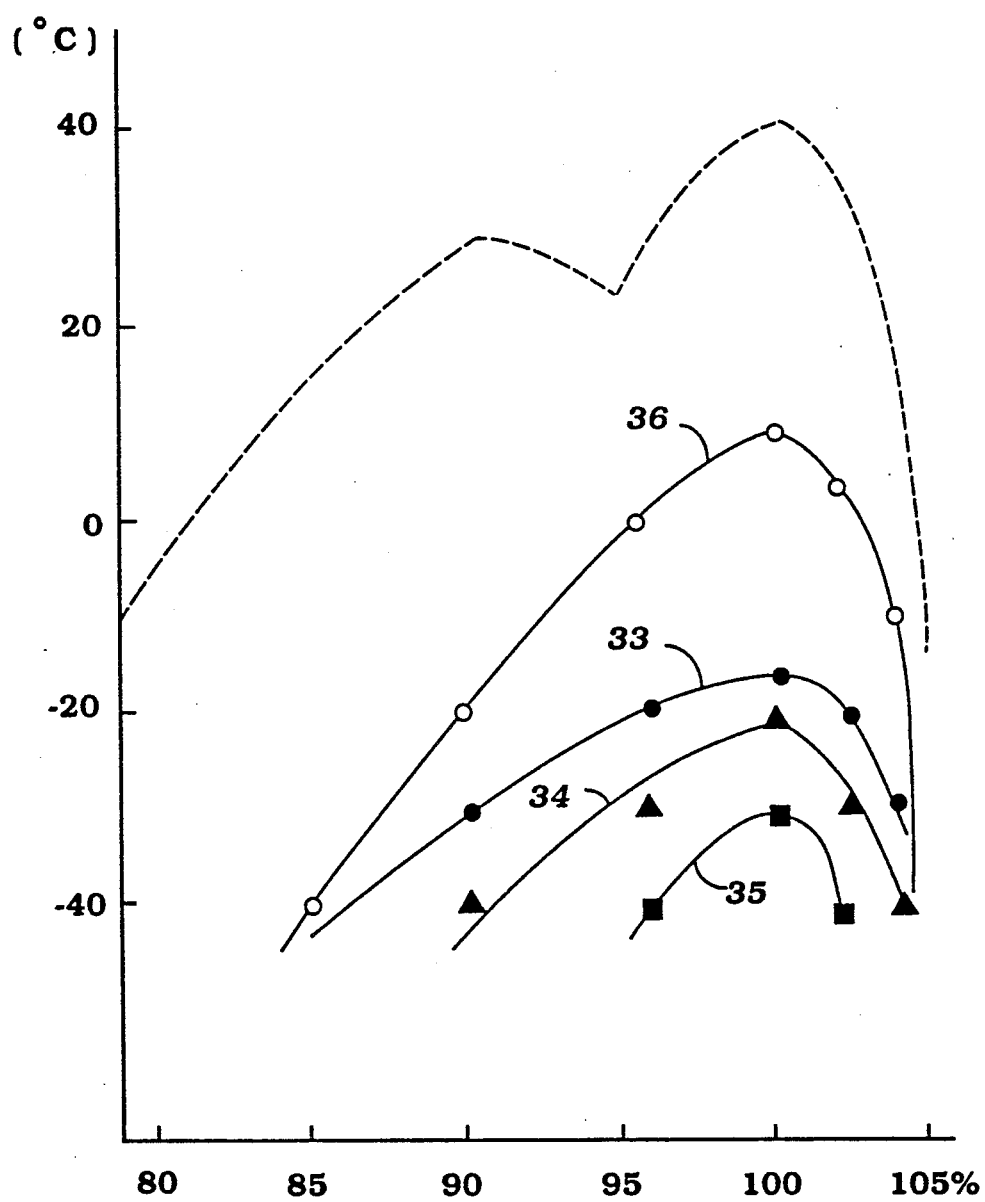
FIG. 5 shows the freezing points in degrees Celsius of various phosphoric acid electrolyte solutions containing a single additive, a mixture of additives or no additives plotted against the concentration of phosphoric acid calculated in terms of orthophosphoric acid in the electrolyte solution.

Experiments were conducted in which $K_2SO_4$ and $KH_2PO_4$ were added to phosphoric acid electrolyte solutions having different concentrations of orthophosphoric acid to determine the change in the freezing points (crystallization temperature) of the various solutions. $K_2SO_4$ was added so as to constitute 3% by weight of the total electrolyte. The freezing points of this solution are shown by the solid circles and curve 33 in FIG. 5. Solutions containing 5% by weight $KH_2PO_4$ of the total electrolyte solution were also tested. Their freezing points are shown by the solid triangles and approximated by curve 34 in FIG. 5. The freezing points of electrolytes containing both 3% by weight $K_2SO_4$ and 5% by weight $KH_2PO_4$ are shown by the solid squares and curve 35 in FIG. 5. As FIG. 5 indicates, the mixture lowered the freezing points of the phosphoric acid solutions more than either one of the additives individually in the concentration ranges tested. The hollow circles connected by curve 36 in FIG. 5 represent the freezing points of phosphoric acid solutions containing no additives.

Figure 6:
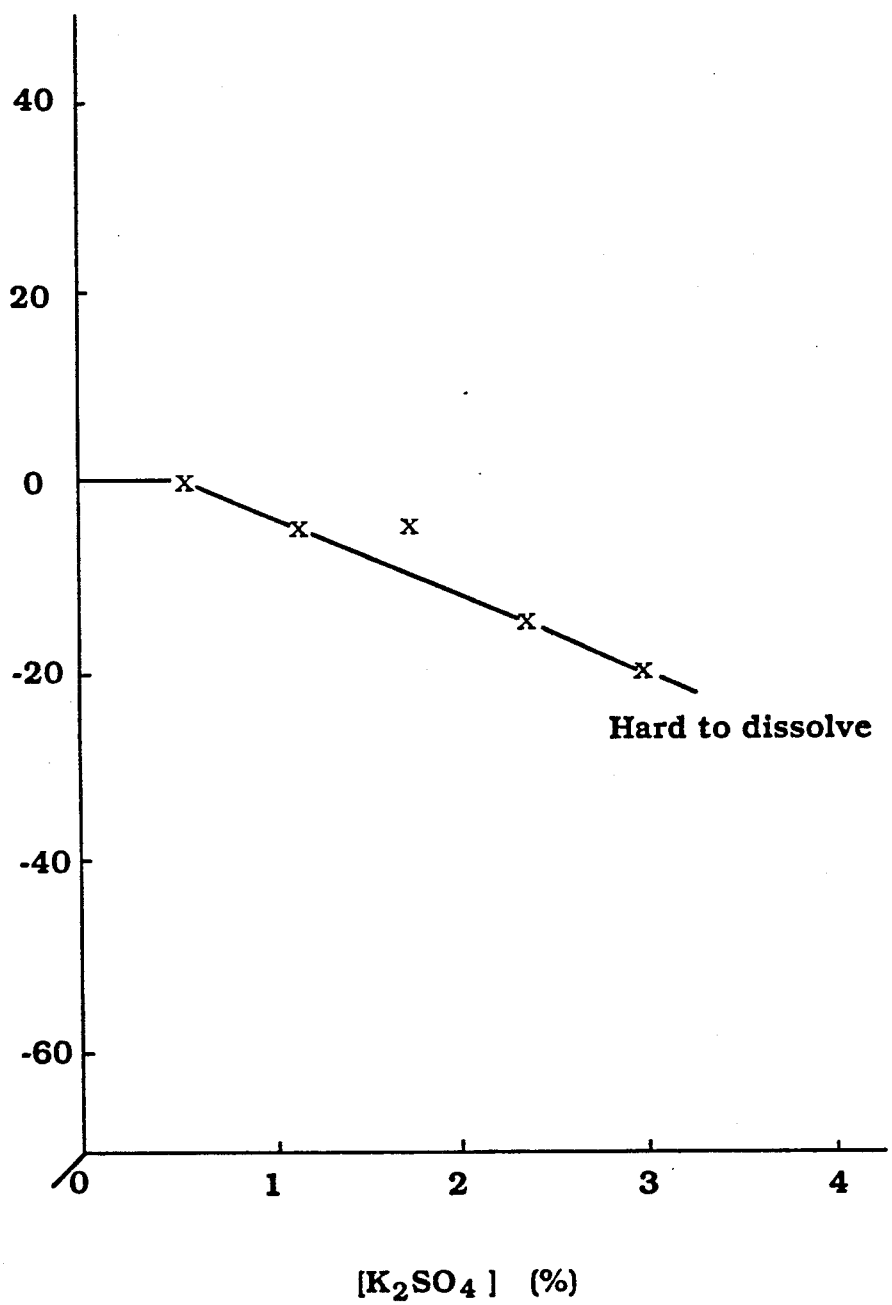
FIG. 6 shows the freezing points of a 100% orthophosphoric acid solution as a function of $K_2SO_4$ concentration.

As shown in FIG. 6, $K_2SO_4$ continues to lower the freezing point of a 100% orthophoshoric acid solution up to a concentration of 3% by weight of the total solution. However, higher concentrations of $K_2SO_4$ do not lower the freezing point any further.

Figure 7:
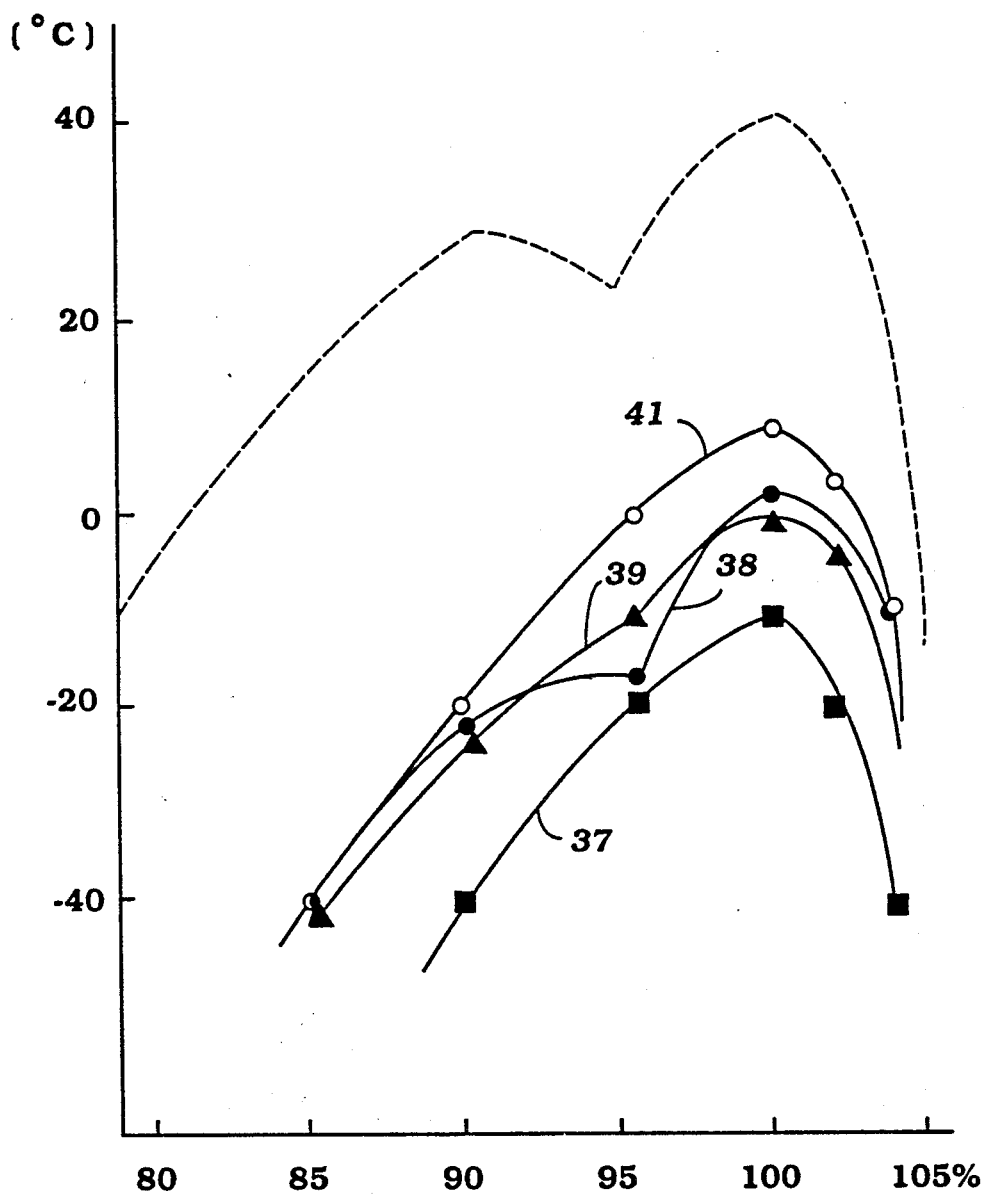
FIGS. 7 and 8 show the freezing points in degrees Celsius of various phosphoric acid electrolyte solutions containing a single additive, a mixture of additives or no additives plotted against the concentration of phosphoric acid calculated in terms of orthophosphoric acid in the electrolyte solution.

A similar synergistic effect was observed when phosphates and hetero acids were added to phosphoric acid solutions of varying concentrations of orthophosphoric acid. As illustrated in FIG. 7, the freezing points of the electrolytes having both 0.7% by weight $KH_2PO_4$ and 12% by weight $H_2SO_4$ shown by the solid squares and curve 37 are lower than the freezing points of the electrolytes having one or the other of these additives. The freezing points of electrolytes having 0.7% by weight $KH_2PO_4$ are shown by the solid circles and curve 38 in FIG. 7, while the freezing points of electrolytes having 12% by weight $H_2SO_4$ are depicted by the solid triangles and curve 39. The hollow circles and curve 41 represent the freezing points of electrolytes having no additives.

Figure 8:
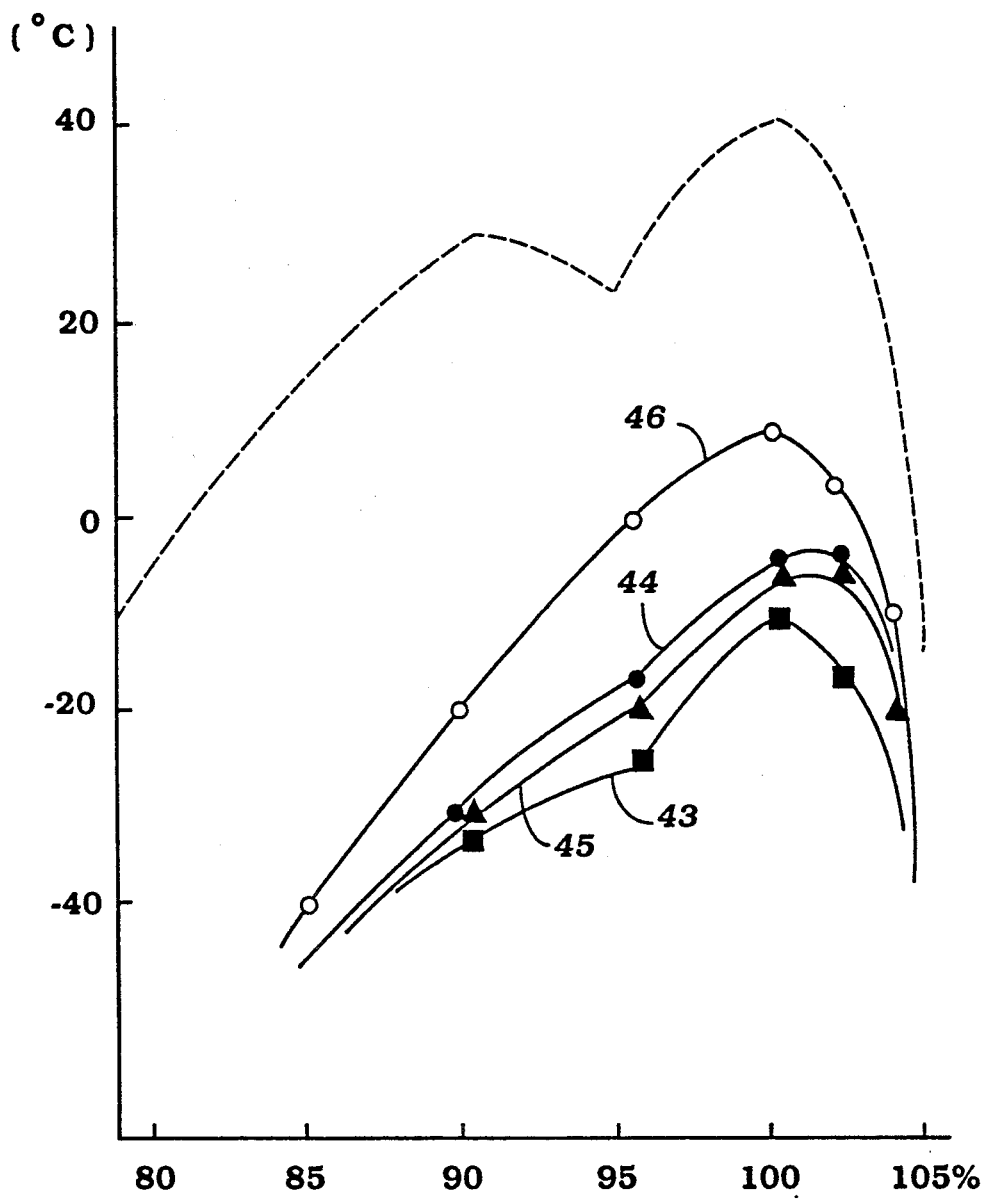

Phosphoric acid electrolytes having a mixture of a non-ionic substance and a phosphate also have lower freezing points than phosphoric acid electrolytes having one or the other of these components or no additives, as shown in FIG. 8. The solid squares and curve 43 represent the freezing points of electrolyte solutions containing both 1% by weight $C_3F_7OH$ and 3.5% by weight $KH_2PO_4$. The solid circles and curve 44 indicate the freezing points of the phosphoric acid electrolyte solutions having a single additive: 1% by weight $C_3F_7OH$. The solid triangles and curve 45 depict the freezing points of phosphoric acid electrolyte solutions containing 3.5% by weight $KH_2PO_4$ as a single additive. The hollow circles, as in the previous figures, are the freezing points of phosphoric acid solutions containing no additives. These circles are connected by curve 46. The dashed lines in FIGS. 5, 7 and 8 show the freezing points of phosphoric acid solutions obtained from the literature.

It should be readily apparent from the foregoing description that improved phosphoric acid electrolyte solutions have been disclosed containing various compounds which lower the freezing points of the electrolytes, as compared with electrolyte solutions of only phosphoric acid. Although numerous embodiments of the invention have been described and illustrated, various modifications may be made in these embodiments without departing from the spirit and scope the invention, as defined by the appended claims.

We claim:

1. An electrolyte for a phosphoric acid type fuel cell comprising phosphoric acid having a concentration of at least 80% calculated in terms of orthophosphoric acid and a conjugate salt comprising an inorganic phosphate, wherein the cation of said inorganic phosphate is selected from the group consisting of alkali metal cations and alkaline earth metal cations.

2. An electrolyte as recited in claim 1, wherein the anion of said phosphate is selected from the group consisting of orthophosphoric acid anions, pyrophosphoric acid anions, triphosphoric acid anions and normal condensation phosphoric acid anions.

3. An electrolyte as recited in claim 1, wherein said phosphoric acid has a concentration between 80 and 105% calculated in terms of orthophosphoric acid.

4. An electrolyte as recited in claim 1, wherein said phosphate constitutes less than 10% by weight of said electrolyte.

5. An electrolyte for a phosphoric acid type fuel cell comprising phosphoric acid having a concentration of at least 80% calculated in terms of orthophosphoric acid and a non-conjugate inorganic salt, wherein the anion of said non-conjugate inorganic salt is selected from the group consisting essentially of sulfuric acid anions, carbonic acid anions, silicic acid anions and boracic acid anions.

6. An electrolyte s recited in claim 5, wherein said phosphoric acid has a concentration between 80 and 105% calculated in terms of orthophosphoric acid.

7. An electrolyte as recited in claim 5, wherein said non-conjugate inorganic salt constitutes less than 30% by weight of said electrolyte.

8. An electrolyte as recited in claim 5, wherein the cation of said nonconjugate inorganic salt is selected from the group consisting of alkali metal ions and alkaline earth metal ions.

9. An electrolyte for a phosphoric acid type fuel cell comprising phosphoric acid having a concentration of at least 80% calculated in terms of orthophosphoric acid and a hetero acid having proton conductivity.

10. An electrolyte as recited in claim 9, wherein said hetero acid is selected from the group consisting of sulfuric acid, boracic acid and silicic acid.

11. An electrolyte as recited in claim 9, wherein said phosphoric acid has a concentration between 80 and 105% calculated in terms of orthophosphoric acid.

12. An electrolyte as recited in claim 9, wherein said hetero acid constitutes less than 50% by weight of said electrolyte.

13. An electrolyte for a phosphoric acid type fuel cell comprising phosphoric acid having a concentration of at least 80% calculated in terms of orthophosphoric acid and a non-ionic substance, wherein said non-ionic substance is of the formula $C_nF_{2n+2-m}(OH)_m$ and wherein n and m are positive integers.

14. An electrolyte as recited in claim 13, wherein said non-ionic substance is of the formula $C_nF_{2n+1}OH$.

15. An electrolyte as recited in claim 13, wherein said phosphoric acid has a concentration between 80 and 105% calculated in terms of orthophosphoric acid.

16. An electrolyte as recited in claim 13, wherein said non-ionic substance constitutes less than 40% by weight of said electrolyte.

17. An electrolyte for a phosphoric acid type fuel cell comprising phosphoric acid having a concentration of at least 80% calculated in terms of orthophosphoric acid and a mixture of at least two kinds of compounds selected from the group consisting of phosphates, non-conjugate inorganic salts, hetero acids having proton conductivity and non-ionic substances.

18. An electrolyte as recited in claim 17, wherein said phosphoric acid has a concentration between 80 and 105% calculated in terms of orthophosphoric acid.

19. An electrolyte as recited in claim 17, wherein said mixture constitutes less than 60% by weight of said electrolyte.

* * * * *